United States Patent
Rohatgi et al.

(10) Patent No.: US 11,570,587 B2
(45) Date of Patent: Jan. 31, 2023

(54) TECHNIQUES FOR REMOTELY CONTROLLING AN APPLICATION

(71) Applicant: Nuance Communications, Inc., Burlington, MA (US)

(72) Inventors: Abhishek Rohatgi, Montreal (CA); John Dolan Heater, Mahwah, NJ (US); Flaviu Negrean, Montreal (CA); Mark P. Hanson, Sunnyvale, CA (US)

(73) Assignee: Nuance Communications, Inc., Burlington, MA (US)

( * ) Notice: Subject to any disclaimer, the term of this patent is extended or adjusted under 35 U.S.C. 154(b) by 81 days.

(21) Appl. No.: 15/417,048

(22) Filed: Jan. 26, 2017

(65) Prior Publication Data
US 2018/0211234 A1 Jul. 26, 2018

(51) Int. Cl.
*H04W 4/14* (2009.01)
*G06F 9/54* (2006.01)
*G06F 21/44* (2013.01)

(52) U.S. Cl.
CPC .............. *H04W 4/14* (2013.01); *G06F 9/542* (2013.01); *G06F 21/44* (2013.01)

(58) Field of Classification Search
CPC ....... G06Q 20/102; G06F 9/445; G06F 9/542; G06F 21/31; H04W 4/14
See application file for complete search history.

(56) References Cited

U.S. PATENT DOCUMENTS

| | | | | |
|---|---|---|---|---|
| 7,814,501 B2* | 10/2010 | Lecoeuche | .......... | G06F 11/3636 719/315 |
| 8,621,451 B1* | 12/2013 | Morley | ..................... | G06F 8/61 717/172 |
| 10,009,291 B1* | 6/2018 | Singh | .................. | H04L 12/4625 |
| 2006/0236304 A1* | 10/2006 | Luo | ............................. | G06F 8/34 717/105 |
| 2010/0174598 A1* | 7/2010 | Khan | ..................... | G06Q 30/02 705/14.32 |
| 2011/0060640 A1* | 3/2011 | Thompson | ......... | G06Q 20/3221 705/14.36 |
| 2011/0087529 A1* | 4/2011 | Angell | ............... | G06Q 30/0236 705/14.13 |
| 2012/0233066 A1* | 9/2012 | Vallabhaneni | ......... | G06Q 40/02 705/40 |
| 2013/0073463 A1* | 3/2013 | Dimmick | ................ | G06F 21/34 726/3 |

(Continued)

OTHER PUBLICATIONS

"Emin Huseynov and Jean-Marc Seigneur, Context Aware Multi-factor Authentication Survey, University of Geneva, 723-724" (Year: 2017).*

*Primary Examiner* — Kito R Robinson
*Assistant Examiner* — Toan Duc Bui

(57) ABSTRACT

According to at least one aspect, a system for remotely controlling an application installed on a device is provided. The system includes at least one processor and at least one computer-readable storage medium storing instructions which program the at least one processor to identify a task for the application installed on the device to perform, transmit a binary short message service (SMS) message to the device including a task code associated with the identified task, receive an information request from the device responsive to the binary SMS message, and transmit task information to the device responsive to receiving the information request.

20 Claims, 5 Drawing Sheets

(56) References Cited

U.S. PATENT DOCUMENTS

| | | | |
|---|---|---|---|
| 2013/0166402 A1* | 6/2013 | Parento | G06Q 20/227 |
| | | | 705/21 |
| 2015/0036928 A1* | 2/2015 | Sheth | G06K 9/00442 |
| | | | 382/187 |
| 2015/0067072 A1* | 3/2015 | Yin | H04L 51/30 |
| | | | 709/206 |
| 2015/0179087 A1* | 6/2015 | Chen | G06K 7/10297 |
| | | | 340/539.11 |
| 2015/0312402 A1* | 10/2015 | Chen | H04W 4/80 |
| | | | 715/863 |
| 2015/0363833 A1* | 12/2015 | Basheer | G06Q 20/24 |
| | | | 705/14.27 |
| 2016/0073443 A1* | 3/2016 | Deiretsbacher | H04L 67/145 |
| | | | 370/328 |
| 2016/0239848 A1* | 8/2016 | Chang | G06Q 30/016 |
| 2017/0149703 A1* | 5/2017 | Willett | H04W 4/21 |
| 2018/0039519 A1* | 2/2018 | Kumar | G06F 9/4812 |

* cited by examiner

TECHNIQUES FOR REMOTELY CONTROLLING AN APPLICATION

BACKGROUND

Enterprises typically provide customers an application to install on a computing device that makes various products and/or services offered by the enterprise available to the customer. For example, a car insurance company may make an application available to customers to install on their mobile phones. The application may permit customers to make changes to an existing car insurance policy and/or purchase a new car insurance policy.

The applications provided by these enterprises typically communicate with external computing devices hosting information associated with the enterprise. For example, a music streaming company may provide an application to customers that allows these customers to stream music from a server operated by the company. The application may stream music for the customer by sending a request to the server to stream a particular song and receiving the music stream from the server.

SUMMARY

According to at least one aspect, a system for remotely controlling an application installed on a device is provided. The system includes at least one processor and at least one computer-readable storage medium storing instructions which program the at least one processor to identify a task for the application installed on the device to perform, transmit a binary short message service (SMS) message to the device including a task code associated with the identified task, receive an information request from the device responsive to the binary SMS message, and transmit task information to the device responsive to receiving the information request.

In some embodiments, the at least one processor is further programmed to identify an event associated with a user of the device. In some embodiments, the at least one processor is further programmed to identify the task for the application to perform based on the event associated with the user of the device. In some embodiments, the event associated with the user includes a bill due date, the identified task includes requesting the user to pay the bill, and the task information includes an amount of the bill.

In some embodiments, the at least one processor is further programmed to transmit an instruction to start a virtual assistant embedded in the application and an instruction for the virtual assistant to ask a user of the device a question through transmission of one or more of the task code and the task information. In some embodiments, the at least one processor is further programmed to transmit task information by transmitting an instruction to authenticate a user of the device. In some embodiments, the at least one processor is further programmed to receive a result of the authentication from the device. In some embodiments, the at least one processor is further programmed to receive a requested task for the application to perform from another system and identify the task for the application to perform based on the requested task.

According to at least one aspect, a method of remotely controlling an application installed on a device is provided. The method includes identifying, by at least one processor, a task for the application installed on the device to perform, transmitting, by at least one processor, a binary short message service (SMS) message to the device including a task code associated with the identified task, receiving, by at least one processor, an information request from the device responsive to the binary SMS message, and transmitting, by at least one processor, task information to the device responsive to the information request.

In some embodiments, the method further includes identifying an event associated with a user of the device. In some embodiments, identifying the task for the application to perform includes identifying the task based on the event associated with the user of the device. In some embodiments, the event associated with the user includes a bill due date, the identified task includes requesting the user to pay the bill, and the task information includes an amount of the bill.

In some embodiments, transmitting the task information includes transmitting an instruction to start a virtual assistant embedded in the application and an instruction for the virtual assistant to ask a user of the device a question. In some embodiments, transmitting the task information includes transmitting an instruction to authenticate a user of the device. In some embodiments, the method further includes receiving a result of the authentication from the device. In some embodiments, the method further includes receiving a requested task for the application to perform and identifying the task for the application to perform includes identifying the requested task.

According to at least one aspect, a device is provided. The device includes at least one processor and at least one computer-readable storage medium storing instructions which program the at least one processor to receive a binary short message service (SMS) message including a task code, transmit a request for information based on the task code to at least one server, receive task information from the at least one server, and open an application installed on the device and start a virtual assistant embedded in the application based on one or more of the task information and the task code.

In some embodiments, the task information includes information regarding an upcoming bill and the at least one processor is further programmed to provide the information regarding the upcoming bill to a user via the virtual assistant. In some embodiments, the at least one processor is further programmed to ask a user of the device a question via the virtual assistant based on the task information, receive a response to the question, and transmit the response to the question to the at least one server. In some embodiments, the at least one processor is further programmed to transmit the request for information by transmitting the task code to the at least one server.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
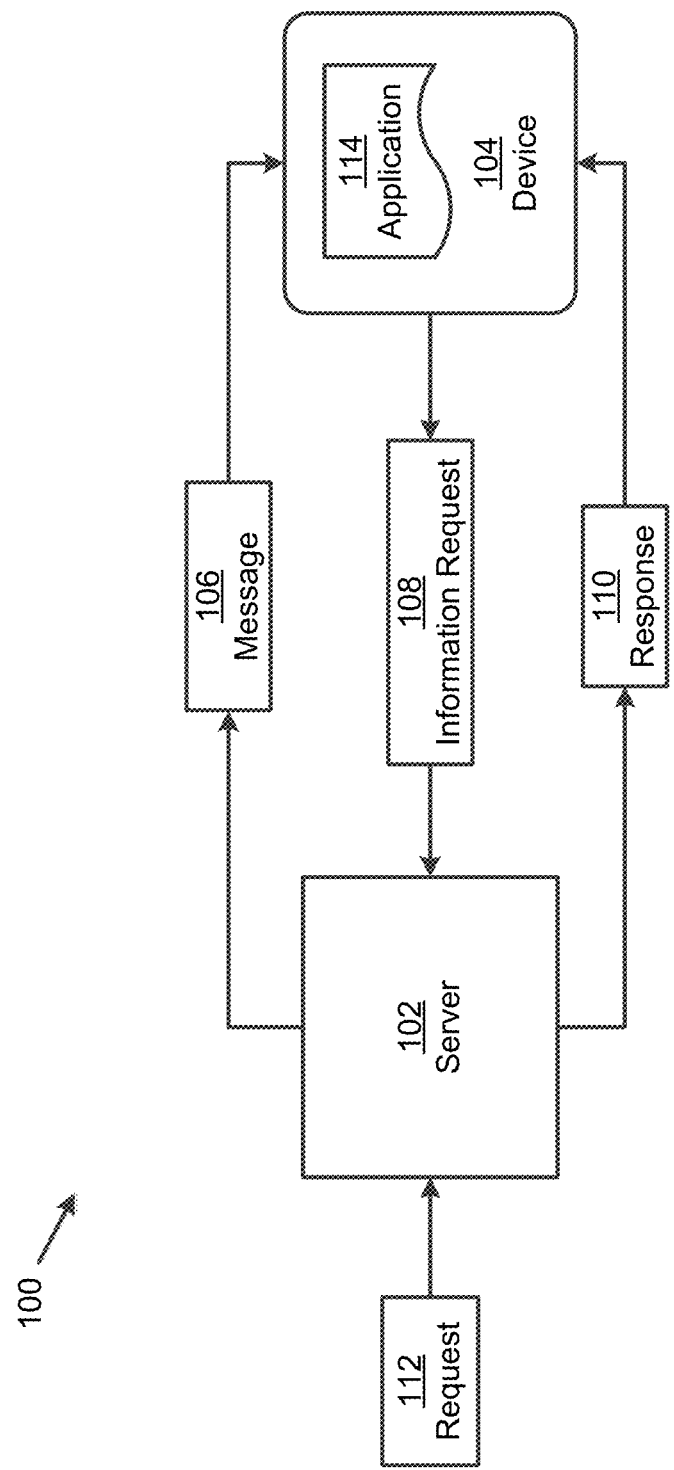
FIG. 1 illustrates an example system for remotely controlling an application on a device, in accordance with some embodiments.

As mentioned above, enterprises typically provide customers with an application that provides these customers access to products and/or services offered by the enterprise. These applications are referred to herein as enterprise applications. Enterprise applications may interact with a server hosting information associated with the enterprise to provide customers access to products and/or services. For example, an electronic commerce company may provide an enterprise application that allows customers to browse the products sold by the company. The enterprise application, in this example, may interact with a server operated by the company to identify the products currently available for sale. In another example, an airline company may provide an enterprise application to allow customers to book flights and/or make changes to existing flights. The enterprise application, in this example, may interact with a server operated by the company to identify available flights.

The inventors have appreciated that conventional enterprise applications do not permit an external computing device to remotely control the enterprise application. Further, the limited communication that occurs between the enterprise application and external computing devices is typically initiated by the enterprise application and requires the enterprise application to be currently running. The inventors have further appreciated that permitting an external computing device to remotely control the enterprise application enables the enterprise to proactively interact with customers. For example, an airline company may cancel a flight and automatically trigger the enterprise application installed on the mobile devices of the affected customers to ask the customers whether they would like to book a new flight. The proactive interaction with customers may be further extended in instances where the enterprise application includes a virtual assistant (sometimes referred to as an intelligent personal assistant) that can issue voice prompts and recognize the received voice commands. An example virtual assistant is NINA by Nuance Communications of Burlington, Mass. In one example, a credit card company may notice an upcoming bill due date for a customer and trigger the enterprise application installed on a mobile device of the customer to issue a voice prompt through a virtual assistant to the customer informing them that "You have an upcoming bill of $100 due on Friday" and asking "Would you like you like to pay your bill now?" In this example, the virtual assistant may be able to recognize voice commands issued by the customer regarding the prompt such as "Please pay the bill now using my bank account on file" and "Remind me tomorrow." Accordingly, the inventors have devised techniques to remotely control an application, such as an enterprise application, and instruct the application to perform desired tasks.

According to some embodiments, a system for remotely controlling an application installed on a target device is provided. The application may be, for example, an enterprise application provided by an enterprise to a user to provide the user access to various services and/or products offered by the enterprise. The target device may be, for example, a mobile computing device such as a mobile phone, a laptop, a tablet, and/or a wearable device. The system may be implemented using, for example, a server including at least one processor and at least one computer-readable storage medium storing instructions which cause the at least one processor to perform processes to remotely control the application installed on the target device. The processes may include identifying a task for the application installed on the target device to perform. The system may identify the task for the application to perform based on information associated with a user of the target device. For example, the application may be an enterprise application for a telecommunications service provider and the system may identify that the user has an upcoming bill payment. In this example, the system may identify a bill payment reminder task for the enterprise application installed on a mobile phone of the user to perform. The system may also identify the task for the target device responsive to a request from another computing device. For example, the user may be interacting with a customer service representative of an electronic commerce company and the customer service representative may need to confirm the identity of the user. In this example, the customer service representative may interact with a computing device to send a request to the system for a customer authentication task to be performed by an enterprise application provided by the company and installed on a mobile phone of the user.

Once the system has identified the task to be performed by the application installed on the target device, the system may send a message to the target device including an indication of the identified task. In some embodiments, the system may transmit a short message service (SMS) message through the cellular network to the target device including a unique task code indicative of the task to be performed. The task code may be, for example, a unique code associated with a task that fits within the maximum data limit of the SMS message. The SMS message may be, for example, a binary SMS message that is ignored by text messaging applications and, thereby, not displayed to the user. Employing a binary SMS message to send the task code may advantageously provide the task code to the target device without bothering the user. In these embodiments, the application installed on the target device may include a software routine that monitors the binary SMS messages received and starts the application (if it isn't already running) when the appropriate binary SMS message is received. Thereby, the system may remotely start the application on the target device.

As discussed above, the system may transmit a task code to the target device in an SMS message that is indicative of a task for the application installed on the target device to perform. The application installed on the target device, however, may still need additional information from the system regarding the task to be performed. For example, the application may determine that task code is indicative of a bill payment reminder task and need additional information regarding the bill such as the amount of the bill, the due date of the bill, and the accepted methods of payment. In another example, the application may rely on the system to decode the task code and send the received task code back to the system to decode. The application may obtain the needed information by issuing an information request to the system. The application may issue the information request using a different communication method than was used by the system to transmit the message containing the task code. For example, the message containing the task code may have been sent to the device using an SMS message and the information request may be sent to the system over an internet connection. Thereby, the system may receive an information request from the target device responsive to the target device receiving the message.

The system may respond to received information request from the target device by obtaining the requested information regarding the task (e.g., task information) and providing the requested information in a response to the target device. For example, the system may receive an information request requesting information regarding an upcoming bill to use in a bill reminder task. In this example, the system may process the received information request by obtaining the information regarding the bill (e.g., retrieve the information from memory and/or communicate with another computing device to retrieve the information) and providing a response to the target device including the information regarding the bill. In another example, the system may receive an information request including a task code transmitted to the target device. In this example, the system may process the received information request by identifying the particular task associated with the task code, obtaining information associated with the task, and providing an indication of the task to perform and the information associated with the task in a response to the target device.

The application installed on the target device may receive a response from the system to a previously transmitted information request that includes task information. The application may, in turn, use the received task information to perform the requested task. For example, the application may have been requested to perform a bill reminder task and received an outstanding balance of the user from the system. In this example, the application may issue a prompt to the user regarding the outstanding balance as part of performing the bill reminder task. In some embodiments, the application may include a virtual assistant that is capable of issuing voice prompts and recognizing voice commands issued by the user. In these embodiments, the application may issue a voice prompt to the user based on the identified task and recognize a response from the user. The recognized response may be transmitted to the system to update information associated with the user. For example, the virtual assistant may issue a voice prompt to the user "A seat upgrade on your next flight is available. Would you like to upgrade your seat?" The user may respond by saying "Yes." In this example, the virtual assistant may recognize the response provided by the user as a voice command to upgrade the seat and transmit a message to the system indicating that the user would like to upgrade the seat.

Following below are more detailed descriptions of various concepts related to, and embodiments of, techniques for remotely controlling an application such as an enterprise application. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 shows an example system 100 for remotely controlling an application installed on a device. The system 100 includes a server 102 and an application 114 installed on a device 104. The server 102 may remotely control the application 114 installed on the device 104. For example, the server 102 may initiate communication with the device 104 by sending a message 106 to the device 104. The message 106 sent to the device 104 may cause the device 104 to execute the application 114 (if the application isn't already being executed). The application 114 may, in response to receipt of the message 106, send an information request 108 to the server 102 to request information regarding a desired task for the application 114 to perform. The server 102 may receive the information request 108 and provide the requested information regarding the desired task to the device 104 in a response 110. In turn, the application 114 may perform the desired task based on the response 110 received from the server 102.

In some embodiments, the server 102 may identify an event associated with the user of the device and identify a task to perform based on the identified event. In these embodiments, the server 102 may identify events by comparing a set of conditions that define an event with information associated with the user. The information associated with the user may be stored in a memory of the server 102 and/or otherwise accessible by the server 102 (e.g., stored by a computing device in communication with the server 102). An example event may be an upcoming bill due date for the user of the device 104 and the set of conditions may include a bill that is due within a predetermined period of time such as five business days. Each of these events may have an associated task for the application 114 to perform. For example, the server 102 may identify an upcoming bill due date and the server 102 may identify an upcoming bill due date reminder task as the appropriate task for the application 114 to perform. In cases where the application 114 is an enterprise application, the particular events identified by the server 102 and their associated tasks may depend on the particular products and/or services offered to the user through the application 114. Table 1 shows a non-exhaustive list of events that may be detected and their associated tasks for application 114 to perform.

TABLE 1

| Example Events and Associated Tasks Organized by Industry | | |
|---|---|---|
| Industry | Event | Identified Task |
| Airline | Canceled Flight | Ask whether user would like to book a new flight and offer similar flights |
| Airline | Delayed Flight | Ask whether user would like to book a new flight and offer similar flights |
| Airline | Available Seat Upgrade | Ask whether user would like to upgrade seat |
| Airline | Flight Check-In Starting | Ask whether user would like to check-in |
| Cellular Phone Services | Upcoming Bill Due Date | Ask whether user would like to pay bill |
| Cellular Phone Services | Entering Roaming Zone | Ask whether user would like to purchasing roaming call time |

TABLE 1-continued

Example Events and Associated Tasks Organized by Industry

| Industry | Event | Identified Task |
|---|---|---|
| Cellular Phone Services | Exceeding Plan Limit (e.g., Data Limit, Text SMS Limit, and Voice Call Time Limit) | Ask whether user would like to change to a plan with a higher limit |
| Financial Services | Payment Deducted from Account | Ask whether user would like to see recent financial statement |
| Financial Services | Check Cashed to Account | Ask whether user would like to see recent financial statement |
| Financial Services | Suspicious Charge to Account | Ask whether user would like to freeze the account |

In some embodiments, the server 102 may identify a task for the device 104 to perform based on a request 112 received from other computer systems. The requests 112 may include an indication of a particular task for the device 104 to perform. For example, the user of the device 104 may be working with a customer service representative associated with an enterprise that provided the application 114. In this example, the customer service representative may need to confirm an identity of the user of the device 104 and send a request 112 to the server 102 requesting the application 114 to perform an authentication task. The application 114 may perform the authentication task by requesting the user of the device 104 to place a finger on a fingerprint reader. The application 114 may compare the fingerprint of the user with fingerprints stored in a memory of the device 104 and provide a result to the customer service representative via the server 102. The result may include an indication of whether the fingerprint of the user matches one or more fingerprints stored in the memory of the device 104.

In some embodiments, the application 114 may include an embedded virtual assistant that is capable of issuing voice prompts and recognize voice commands. In these embodiments, the tasks identified by the server 102 may leverage the functionality of the embedded virtual assistant. For example, the virtual assistant may be leveraged to issue voice prompts in the identified task. Further, the virtual assistant may be employed to recognize a voice response to the prompt from the user and provide the response to the server 102. For example, the virtual assistant embedded in the application 114 may issue a voice prompt to the user "Would you like to pay your bill now" to perform a bill reminder task. In this example, the virtual assistant may receive a response from the user "Please pay using my default bank account" that is, in turn, provided to the server 102 to process. Thereby, the user may audibly respond to the issued prompts without navigating the user interface of the application 114.

The server 102 may send a message 106 to the device 104 to initiate communication with the device 104. In some embodiments, the message 106 may be transmitted to the device 104 through a cellular network using an SMS message. In these embodiments, the application 114 may include a software routine that intercepts SMS messages received by the device 104 and analyzes the received SMS messages to determine whether they originated from the server 102. For example, the software routine may analyze the received SMS messages to determine whether the SMS messages include a particular sequence of characters or other code indicative of the SMS messages originating from the server 102. If the software routine determines that the message originated from the server 102, the software routine may start the application 114 on the device 104 (if it is not already running). Once the application 114 is running on the device 104, the application 114 may direct the device 104 to communicate with the server 102 to gather information needed to perform a desired task.

Implementing the message 106 as an SMS message provides various advantages relative to other approaches. For example, the SMS message may be received by the device 104 regardless of whether the application 114 is closed or running. Thereby, the server 102 may initiate communication with the device 104 at any time that the device 104 is turned on and is in range of a cell tower. Further, the SMS message may be hidden from the user of the device 104 so as not to interrupt their interaction with the device 104. For example, the SMS message may be a binary SMS message (as opposed to a text SMS message) that is typically ignored by text messaging applications on the device 104. Thereby, the server 102 may initiate communication with the device 104 without the message being visible to the user through a text messaging application. It should be appreciated that the message 106 may be implemented as a text SMS message in some embodiments. For example, it may be desirable to simultaneously alert the user that a payment date for a bill is approaching and trigger the application 114 to ask the user whether they would like to pay their bill. In this example, the server 102 may send a text SMS message to the device 104 that may be both detected by a text messaging application on the device 104 for display to the user and detected by the application 114 to trigger the application to start and request the user to pay the bill.

The message 106 may include information indicative of the desired task to be performed by the device 104. In some embodiments, the message 106 may include a task code that is indicative of a desired task for the device 104 to perform. The task code may be a unique sequence of characters (e.g., letters, numbers, and/or symbols) that corresponds to a particular task. In these embodiments, the application 114 may use the task code to identify the desired task to perform. For example, the application 114 may include a table that relates each task code to a specific task to perform. In another example, the application 114 may send the received task code in the information request 108 to the server 102 and rely on the server 102 to identify the task associated with the task code.

As discussed above, the application 114 may include a software routine that starts the application 114 (if it isn't already running) in response to receiving the message 106. The application 114 may, in response to receipt of the message 106, communicate with the server 102 to obtain any additional information required to perform the identified task. This additional information regarding the desired task may be omitted from the original message 106 due to, for example, data size constraints of the message 106. For example, the message 106 may be sent as a binary SMS message with a maximum size of 1,120 bits. The application 114 may communicate with the server 102 using a different method of communication than was employed to transmit the message 106. For example, the message 106 may be transmitted using an SMS message and the application 114 may communicate with the server 102 using an internet connection.

In some embodiments, the application 114 may analyze the message 106 to determine whether additional information is needed to perform the desired task. If additional information is needed, the application 114 may direct the device 104 to send an information request 108 to the server 102 to obtain the needed information. For example, the message 106 may include information indicative of a desired task to ask the user of the device 104 if they would like to pay an upcoming bill. In this example, the device 104 may send an information request 108 to the server 102 over the internet requesting information regarding the amount of the bill, a due date of the bill, and/or available methods to receive payment for the bill.

The server 102 may receive the information request 108 and provide the information requested in the information request 108 in the response 110 to the device 104. For example, the server 102 may have sent a message 106 to the device 104 to including a task code associated with a task to ask the user whether they would like to rebook a canceled flight. In this example, the server 102 may receive an information request 108 requesting the details of the canceled flight (e.g., flight departure time and flight destination) and information indicative of similar flights (e.g., flights with similar departure times and destinations). The server 102 may respond to the information request 108 by generating a response 110 including the details of the canceled flight and information regarding similar flights.

Figure 2:
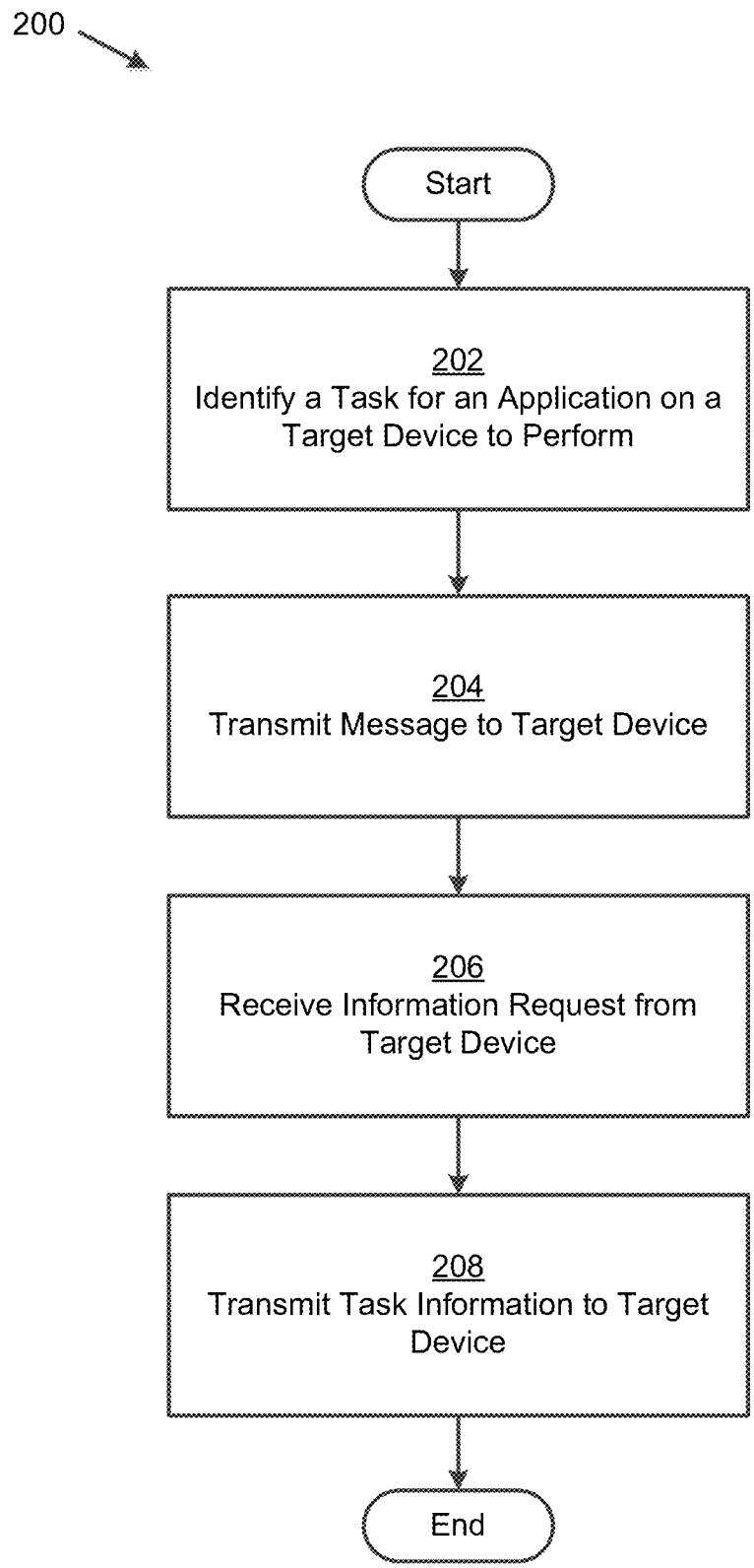
FIG. 2 illustrates a method of remotely requesting an application to perform a task, in accordance with some embodiments.

As discussed above, the aspects of the present disclosure relate to various techniques to remotely control an application installed on a device. FIG. 2 shows an example process 200 for remotely controlling an application installed on a device that may be performed by a system (e.g., server 102 in FIG. 1). As shown, the process 200 includes an act 202 of identifying a task for an application on a target device to perform, an act 204 of transmitting a message to the target device, and act 206 of receiving an information request from the target device, and an act 208 of transmitting task information to the target device.

In act 202, the system may identify a task for an application on the target device to perform. The system may identify the task for the application on the target device to perform based on, for example, information associated with a user of the target device. In some embodiments, the system may identify an event associated with the user and identify a task for the application to perform based on the identified event. For example, the system may identify an upcoming bill to be paid by the user and identify a corresponding bill reminder task to be performed by the application.

In some embodiments, the system may identify the task for the application to perform based on a received request from another computer system. For example, a user may be interacting with a customer service representative from an electronic commerce company to resolve a problem with an order. In this example, the customer service representative may want to confirm the identity of the customer and send a request to the system to have the application provided by the electronic commerce company installed on the user's mobile phone perform an authentication task. The system may, in turn, send a request to the application to perform the authentication task.

In act 204, the system may transmit a message to the target device. The message may include information indicative of the task to be performed by the target device. For example, the message may include a task code including a unique sequence of characters that corresponds to a particular task. The message may be transmitted to the target device using any of a variety of communication methods. In some embodiments, the message may be transmitted to the device as an SMS message, such as a binary SMS message or a text SMS message. Transmitting the message as an SMS message may provide various advantages relative to other approaches. For example, the target device may be able to receive the message regardless of whether the application on the target device is running and/or whether the device is in a low-power mode (e.g., a standby mode).

In act 206, the system may receive an information request from the target device. The information request may include a request for additional information regarding the desired task to be performed. For example, the system may have transmitted a message to the target device in act 204 requesting the target device to ask the user whether they would like to pay their bill. In this example, the system may receive an information request for additional information regarding the particular bill to be paid such as an amount due, a due date of the amount, and/or accepted methods of payment. The information request may be received from the target device via a different method of communication than the message was transmitted using in act 204. For example, the message may have been transmitted in act 204 as an SMS message and the information request may have been received via an internet connection.

In act 208, the system may transmit task information to the target device in a response responsive to receiving the information request. For example, the system may obtain the information requested in the received information request by reading data from a memory in the system and/or by communicating with another computing device. In this example, the obtained information may be transmitted to the target device in a response. The response may be transmitted using the same communication method as the information request received in act 206. For example, both the information request and the response may be transmitted over an internet connection between the system and the target device.

Figure 3:
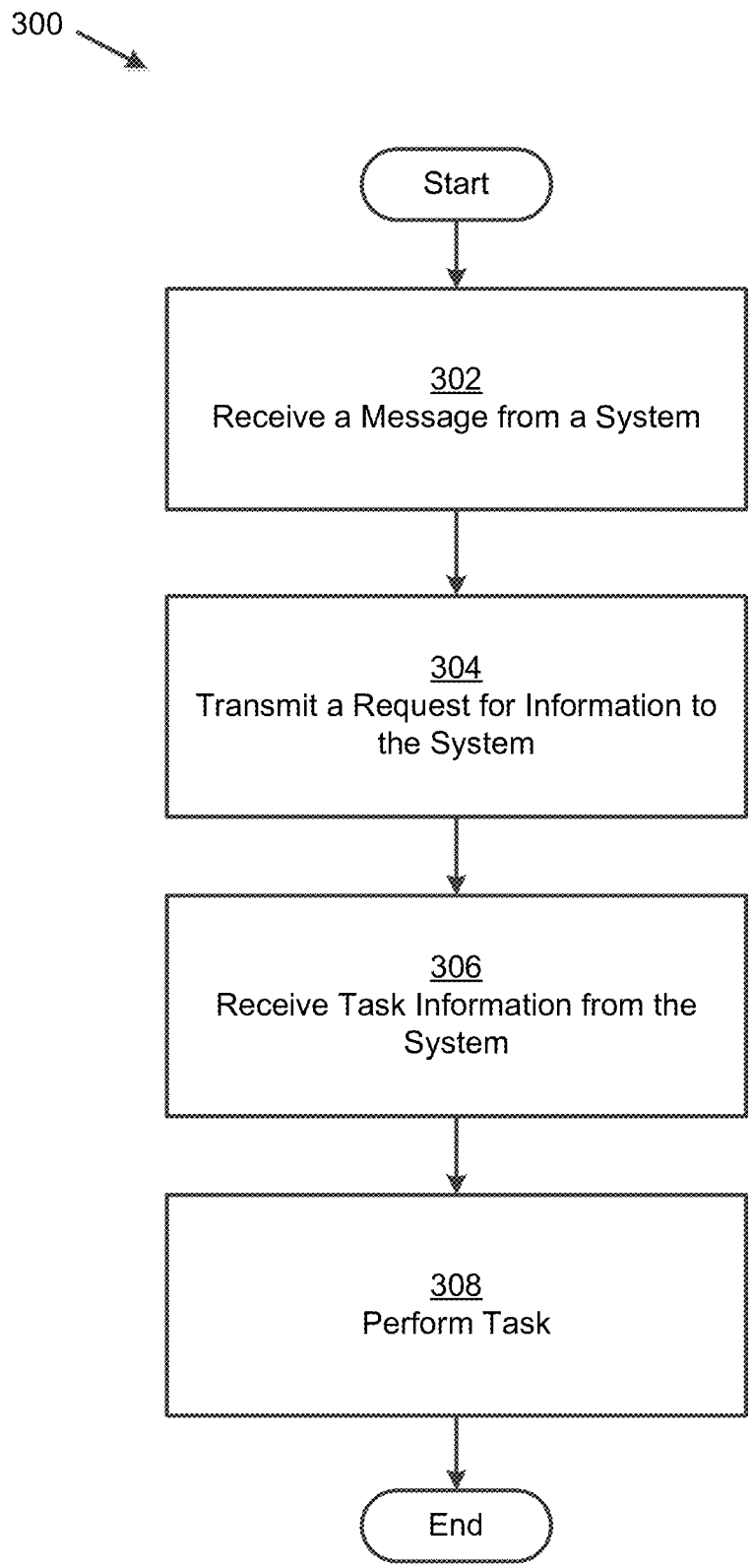
FIG. 3 illustrates an example method of processing a received request to perform a task, in accordance with some embodiments.

FIG. 3 shows an example process 300 for processing a received request to perform a task that may be performed by an application (e.g., application 114 in FIG. 1) installed on a device (e.g., device 104 in FIG. 1). As shown, the process 300 includes an act 302 of receiving a message from a system, an act 304 of transmitting a request for information to the system, an act 306 of receiving task information from the system, and an act 308 of performing the identified task.

In act 302, the application may receive a message from an external system (e.g., server 102 in FIG. 1). For example, the device may receive an SMS message, such as a binary SMS message or a text SMS message, that is detected by a software routine in the application. The software routine may trigger the application to start (if it is not already running on the device) in response to detecting the SMS message. This software routine may be installed on the device as part of the installation of the application. In some embodiments, the message may include a task code indicative of the task to be performed by the application. The task code may be, for example, a unique sequence of characters associated with a particular task for the application to perform. In these embodiments, the application may use the task code to determine the appropriate task to perform. For example, the application may include a table that stores information indicative of the task to perform when a particular task code is received. In another example, the application may send the task code to the system in an information request over the internet and rely on the system to decode the task code and provide an indication of the particular task to perform.

In act 304, the application may transmit a request for information to the system. The request for information may include information regarding the task to be performed by the application. In embodiments where the received message includes a task code, the request for information may include a request for additional information regarding the task to be performed. For example, the application may determine that a bill reminder task is to be performed based on the task code. In this example, the application may request additional information regarding the bill to include in a prompt to the user such as the amount of the bill, the due date of the bill, and/or the accepted methods of payment for the bill. In embodiments where the received message does not include a task code, the request for information may include a request for a particular task to perform. The request for information may be transmitted to the system using a different communication method than was employed for the message received in act 302. For example, the message received in act 302 may have been transmitted in an SMS message and the request for information may be transmitted over an internet connection to the system.

In act 306, the application may receive task information from the system. The task information received from the system may be in response request for information transmitted to the system in act 304. The task information may be received over the same communication method employed to transmit the request for information. For example, the application may transmit the request for information to the system over the internet and receive the task information from the system over the internet. The received task information may include the information requested in the information request transmitted in act 304. For example, the task information may include an indication of the task to perform and/or details regarding the task to perform.

In act 308, the application may perform the identified task based on the received task information from the system. For example, the identified task may be a bill reminder task and the application may ask the user whether they would like to pay their bill. In this example, the application may receive a response from the user and transmit the response to the system (e.g., over an internet connection). In some embodiments, the application may include a virtual assistant embedded into the application. In these embodiments, the application may use the virtual assistant to perform all or any portion of the identified task. For example, the virtual assistant may issue a voice prompt to the user asking "Would you like to pay your bill now." In this example, the virtual assistant may receive a response from the user such as "remind me next week" and transmit the received response to the system.

Having described example processes, it should be appreciated that various alternations may be made to the described processes without departing from the scope of the present disclosure. For example, various acts may be omitted, combined, repeated, or added. Further, the acts in the method described herein do not need to be performed in the particular order shown.

Figure 4A:
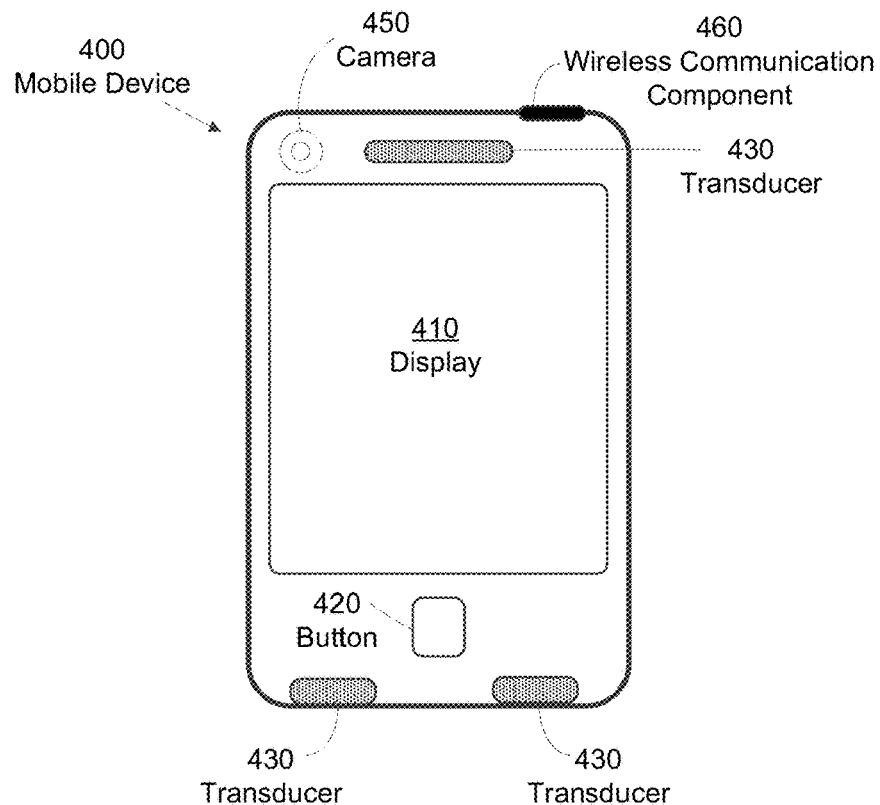
FIGS. 4A and 4B illustrate an exemplary mobile device on which techniques described herein may be performed, in accordance with some embodiments.
Figure 4B:
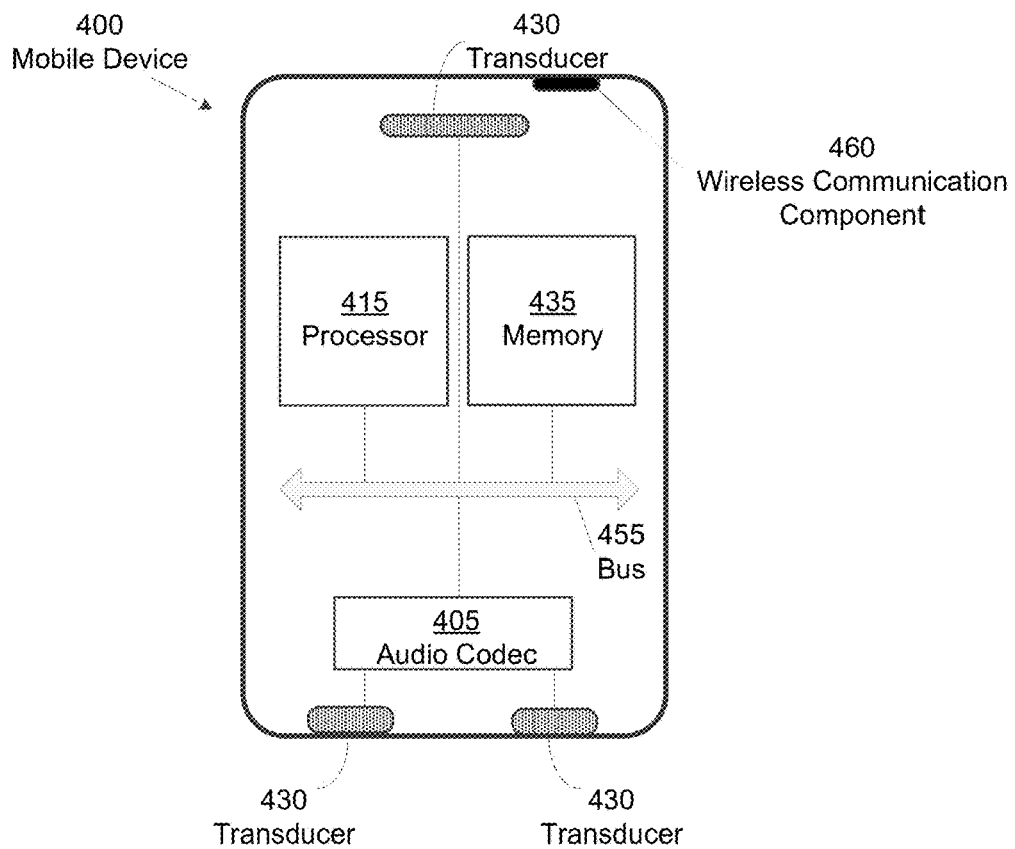

An illustrative implementation of a mobile device that may be used in connection with any of the embodiments of the disclosure provided herein is shown in FIGS. 4A and 4B. For example, the device 104 shown in FIG. 1 may be implemented as the mobile device 400 shown in FIGS. 4A and 4B. The mobile device 400 is illustrated as having a number of components characteristic of a "smart phone," but it should be appreciated that mobile device 400 may be any generally portable device capable of wireless communications (and/or wired communications). Mobile device 400 includes one or more transducers 430 for converting acoustic energy to electrical energy and vice versa. For example, transducers 430 may include one or more speakers and/or one or more microphones arranged on the mobile device to allow input/output (I/O) of acoustic information. Different mobile devices may include differing numbers and arrangements of transducers, any of which may be suitable to facilitate acoustic I/O. The transducers 430 may be utilized by a virtual assistant embedded into an application installed on the mobile device 400 to communicate with a user. For example, the virtual assistant may issue voice prompts to the user through a speaker and receive voice commands from the user through a microphone.

Mobile device 400 may also include one or more wireless communication components 460. For example, mobile communication devices such as cellular telephones will typically have a wireless transceiver capable of communicating with one or more cellular networks. Alternatively, or in addition to, wireless communication component 460 may include a wireless transceiver capable of communicating with one or more other networks or external devices. For example, wireless communication component 460 may include a component configured to communication via the IEEE 802.11 standard (Wi-Fi) to connect to a local area network (LAN), wide area network (WAN) such as the Internet, and/or may include a Bluetooth® transceiver to connect to a Bluetooth® compatible device. Wireless communication component 460 may also include a Global Positioning System (GPS) to communicate with a satellite network to determine the location of the mobile device, or may include one or more other wireless communication transceivers.

To simplify the illustration of exemplary mobile device 400, wireless communication component 460 is used to represent any wireless communication component 460 implemented on mobile device 400 and may include one or multiple components that may be either separate or integrated components, may be independent system components, or may be different system components in communication with one or more other wireless components. That is, wireless communication component 460 denotes one or any combination of components that may be implemented on a mobile device that allows the mobile device 400 to communicate wirelessly with one or more networks, systems and/or other devices. For example, the wireless communication component 460 may include components to receive SMS messages, such as text SMS messages and binary SMS messages, and/or establish an internet connection.

Mobile device 400 may also include a display 410 for visually presenting information to the user (e.g., presenting one or more prompts to the user). Display 410 may also be configured as an input device, for example, by responding to touch, pen input, etc. Mobile device 400 may include one or more other input components that allow a user to interface with the mobile device. For example, button 420 may be used as a selection button or may include any other functionality. Button 420 may be a power button, volume button, or any other input component having any desired functionality. Different mobile devices may have different numbers and arrangements of input components 420 depending on the design of the mobile device.

Mobile device 400 may also include other components such as one or more cameras 450, one or more motion detectors, and/or any other components. Mobile device 400 may also include a power port (not shown) for connecting the mobile device to a power source (e.g., wall power) and/or a data port for providing/receiving data to/from another device connected via a data cable. According to some mobile device designs, the data and power port are the same port and can be used both for power and for data. It should be appreciated that mobile device 400 is merely an example of a mobile device suitable for use with any one or combination of voice activation techniques described herein. The mobile device components are described to illustrate common features of smart phones, but no particular one or combination of these components are required. Techniques described herein are not limited for use with any particular mobile device having any particular number or arrangement of components and any mobile device having the ability to receive acoustic input may be suitable, as the aspects described herein are not limited in this respect.

FIG. 4B illustrates an example configuration of system components internal to a mobile device, such as mobile device 400 illustrated in FIG. 4A. Exemplary system components of a mobile device may include a processor 415 and an audio codec 405, all illustrated for convenience and clarity of illustration as being interconnected via a common bus 455. Mobile device 400 also includes a memory 435 for storing data, e.g., instructions or programs that can be executed by the processors, state data, or any other information utilized by the mobile device. For example, the memory 435 may store an application that may be remotely controlled by an external computer system (e.g., application 114 in FIG. 1). The memory 435 may include a non-transitory computer readable medium. It should be appreciated that a given mobile device may include additional processing components interconnected in any of numerous ways using any type of interconnection, and the particular configuration illustrated in FIG. 4B is just one example implementation.

Figure 5:
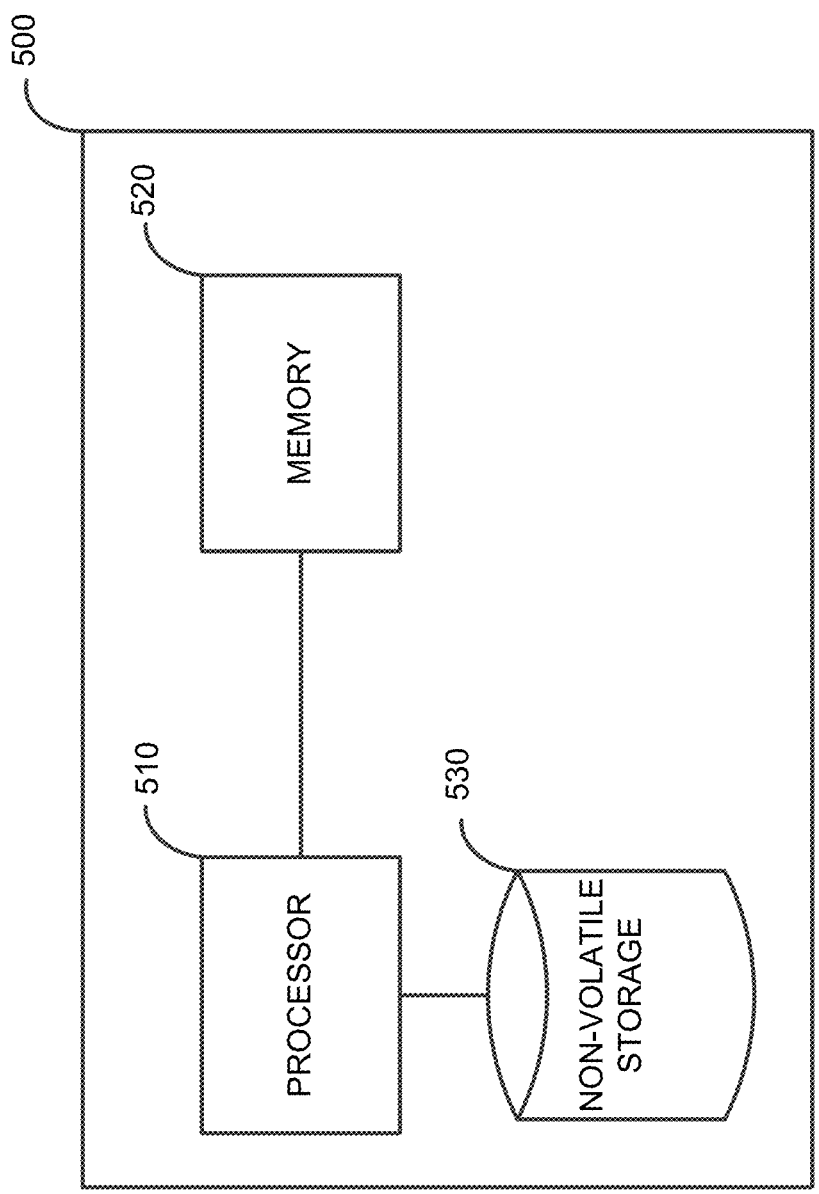
FIG. 5 illustrates an exemplary computer system on which techniques described herein may be performed, in accordance with some embodiments.

An illustrative implementation of a computer system 500 that may be used in connection with any of the embodiments of the disclosure provided herein is shown in FIG. 5. For example, the server 102 shown in FIG. 1 may be implemented as the computer system 500 shown in FIG. 5. The computer system 500 may include one or more processors 510 and one or more articles of manufacture that comprise non-transitory computer-readable storage media (e.g., memory 520 and one or more non-volatile storage media 530). The processor 510 may control writing data to and reading data from the memory 520 and the non-volatile storage device 530 in any suitable manner, as the aspects of the disclosure provided herein are not limited in this respect. To perform any of the functionality described herein, the processor 510 may execute one or more processor-executable instructions stored in one or more non-transitory computer-readable storage media (e.g., the memory 520), which may serve as non-transitory computer-readable storage media storing processor-executable instructions for execution by the processor 510.

To perform functionality and/or techniques described herein, the processor 510 may execute one or more instructions stored in one or more computer-readable storage media (e.g., the memory 520, storage media, etc.), which may serve as non-transitory computer-readable storage media storing instructions for execution by processor 510. Computer system 500 may also include any other processor, controller or control unit needed to route data, perform computations, perform I/O functionality, etc. For example, computer system 500 may include any number and type of input functionality to receive data and/or may include any number and type of output functionality to provide data, and may include control apparatus to perform I/O functionality. For example, processor 415 and/or processor 425 and computer readable medium 435 may be implemented by computer system 500.

Processor 510 may execute any one or combination of programs that are available to the processor by being stored locally on computer system 500 or accessible over a network. Any other software, programs or instructions described herein may also be stored and executed by computer system 500. Computer system 500 may be the computer system on a mobile device. Computer system 500 may also be implemented as a standalone computer, server, part of a distributed computing system, and may be connected to a network and capable of accessing resources over the network and/or communicate with one or more other computers connected to the network (e.g., computer system 500 may be part of the network resources available to a voice response system implemented on a mobile device).

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for remotely controlling an application installed on a remote device, the system comprising:
   at least one processor; and
   at least one computer-readable storage medium storing instructions, that, when executed by the at least one processor, cause the at least one processor to:
   using a binary short messaging service (SMS), send a request to the application, via a cellular network, while the remote device is in a standby mode, to perform a task, the request including a task code associated with the task, the binary SMS causing the remote device to be activated without the request being displayed to a user of the remote device, and causing the application to start and use data available on the remote device to decode the task code, from among task codes for a plurality of tasks that the application is configured to perform;
   receive a request, via an internet connection from the application for additional information required to perform the task based on the task code decoded by the application; and
   provide, via the internet connection, the additional information to the application and trigger the application to perform the task using the decoded task code and the provided additional information.

2. The system of claim 1, wherein triggering the application includes prompting the application to ask the user a question associated with the task, elicit a response to the question from the user, and transmit the response, via the internet connection, to the system for action.

3. The system of claim 2, wherein triggering the application includes triggering the application to issue a voice prompt to the user, recognize a voice response to the voice prompt from the user, and perform the task based on the voice response.

4. The system of claim 3, wherein issuing a voice prompt to the user includes asking the user whether the user would like to pay a bill having an imminent due date and performing the task includes taking action to pay the bill based on the voice response.

5. The system of claim 1, wherein the instructions, when executed by the at least one processor, further cause the at least one processor to transmit an instruction to the remote device to start a virtual assistant embedded in the application and an instruction for the virtual assistant to ask the user a question.

6. The system of claim 1, wherein the instructions, when executed by the at least one processor, further cause the at least one processor to transmit an instruction to authenticate the user.

7. The system of claim 6, wherein the instructions, when executed by the at least one processor, further cause the at least one processor to receive a result of the authentication from the remote device.

8. The system of claim 1, wherein the instructions, when executed by the at least one processor, further cause the at least one processor to receive the request for the application to perform the task from another system.

9. A method of remotely controlling an application installed on a device, the method comprising:
   using a binary short messaging service (SMS), sending by a processor a request to the application, via a cellular network, while the device is in a standby mode, to perform a task, the request including a task code associated with the task, the binary SMS causing the device to be activated without the request being displayed to a user of the device, and causing the application to start and use data available on the device to decode the task code from among task codes for a plurality of tasks that the application is configured to perform;
   receiving, by the processor, a request from the application, via an internet connection, for additional information required to perform the task based on the task code decoded by the application; and providing, by the processor, via the internet connection, the additional information to the application and triggering, by at least on processor, the application to perform the task using the decoded task code and the provided additional information.

10. The method of claim 9, wherein triggering the application includes prompting the application to ask the user a question associated with the task, elicit a response to the question from the user, and transmit the response, via the internet connection, to a system for action.

11. The method of claim 9, wherein triggering the application includes triggering the application to issue a voice prompt to the user, recognize a voice response to the voice prompt from the user, and perform the task based on the voice response.

12. The method of claim 11, wherein issuing a voice prompt to the user includes asking the user whether the user would like to pay a bill having an imminent due date and performing the task includes taking action to pay the bill based on the voice response.

13. The method of claim 9, wherein the method further comprises transmitting an instruction to the device to start a virtual assistant embedded in the application and an instruction for the virtual assistant to ask the user a question.

14. The method of claim 9, further comprising transmitting an instruction to authenticate the user.

15. The method of claim 14, further comprising receiving a result of the authentication from the device.

16. A device comprising:
   at least one processor; and
   at least one computer-readable storage medium storing instructions that, when executed by the at least one processor, cause the at least one processor to:
   receive a message, via a binary short messaging service (SMS) while the device is in a standby mode, the message including a request to an application installed on the device, the request including a task code associated with performance of a task by the application;
   triggered by the receiving of the message including the task code, activate the device without displaying the message to a user of the device, open the application installed on the device, cause the application to decode the task code using data available on the device to decode the task code, start a virtual assistant embedded in the application to communicate with the user of the device based on the decoded task code and obtain a user response to the communication, wherein the application performs the task based on the decoded task code and the user response.

17. The device of claim 16, wherein the communication comprises a voice prompt regarding an upcoming bill and the user response comprises a voice command associated with the upcoming bill.

18. The device of claim 16, wherein the at least one processor is further programmed to ask the user of the device a question via the virtual assistant, receive a response to the question, and transmit the response to the question to at least one server.

19. The device of claim 16, wherein the at least one processor is further programmed to transmit a request for information to at least one server by transmitting the task code to at least one server.

20. The device of claim 16, wherein the at least one processor is further programmed to:
   receive, from the application, an information request based on the decoded task code, the information request requesting additional information for performance of the task by the application; and
   transmit the information request to at least one server for providing the additional information.

\* \* \* \* \*